United States Patent [19]
Lippens

[11] Patent Number: 5,339,554
[45] Date of Patent: Aug. 23, 1994

[54] CATFISH WORM DRYER

[76] Inventor: Philip S. Lippens, 310 S. Grove St., Kewanee, Ill. 61443

[21] Appl. No.: 101,116
[22] Filed: Aug. 3, 1993
[51] Int. Cl.⁵ ............................................. A01K 97/06
[52] U.S. Cl. ............................................................ 43/4
[58] Field of Search ................ 43/4, 54.1, 55, 42.53

[56] References Cited

U.S. PATENT DOCUMENTS

| | | | |
|---|---|---|---|
| 2,743,546 | 5/1956 | Crist | 43/54.1 |
| 2,885,814 | 5/1959 | Schlador | 43/4 |
| 2,929,166 | 3/1960 | Sneide | 43/4 |
| 4,073,085 | 2/1978 | Stremeckus | 43/54.1 |
| 4,527,350 | 7/1985 | Tockey, Jr. | 43/54.1 |
| 4,771,564 | 9/1988 | Whitley | 43/4 |
| 4,819,367 | 4/1989 | Ponder, Jr. et al. | 43/55 |
| 4,859,102 | 8/1989 | Chamieh | 401/17 |
| 4,866,806 | 9/1989 | Bedford | 15/104.94 |
| 4,882,872 | 11/1989 | Todd | 43/55 |
| 5,097,616 | 3/1992 | Johnston, Jr. | 43/4 |
| 5,187,890 | 2/1993 | Johnston | 43/4 |

Primary Examiner—P. Austin Bradley
Assistant Examiner—Chuck Y. Mah
Attorney, Agent, or Firm—Henderson & Sturm

[57] ABSTRACT

This invention teaches a method and apparatus for drying artificial catfish worms prior to the application of fishing lure scent. The apparatus utilizes a vinyl sheet which is folded back upon itself into a V-shape and into which are affixed a pair of water absorbent pads. The wet lure is placed within the device, which is then pressed closed for a short period while moisture from the lure is absorbed by the pads. The device then naturally springs to the open position so the pads may dry for subsequent use.

3 Claims, 1 Drawing Sheet

CATFISH WORM DRYER

TECHNICAL FIELD

The present invention relates to the field of fishing accessories, and more particularly concerns an apparatus for drying artificial catfish worms before applying fishing lure scent thereto.

BACKGROUND ART

The use of artificial lures is well known in the art. More recently the utilization of fishing lure scents has become popular, as it is believed that fish are capable of detecting the smell of man on these lures, or simply that the artificial lure does not have a natural odor. These fishing lure scents may be applied in numerous ways, and several of the application devices have received U.S. Letters Patent.

DISCLOSURE OF THE INVENTION

In catfishing, a lure commonly used is an artificial worm. The worm is secured to the fishing line and is then dipped into a bottle of fishing lure scent before being placed into the water. After some time period, the worm is removed from the water and again dipped into the fishing lure scent to replace that which has been washed away by the water.

This invention teaches a method and apparatus for drying artificial catfish worms prior to the application of fishing lure scent. When a wet artificial worm is dipped into the fishing lure scent, it absorbs much less scent that does a dry worm. This of course greatly reduces the effectiveness of the lure. The apparatus utilizes a molded vinyl sheet which is folded back upon itself into a V-shape and into which are affixed a pair of water absorbent pads. The wet lure is placed within the device, which is then pressed closed for a short period while moisture from the lure is absorbed by the pads. The device then naturally springs to the open position so the pads may dry for subsequent use.

BRIEF DESCRIPTION OF THE DRAWINGS

These and other attributes of the invention will become more clear upon a thorough study of the following description of the best mode for carrying out the invention, particularly when reviewing in conjunction with the drawing, wherein.

BEST MODE FOR CARRYING OUT THE INVENTION

Figure 1:
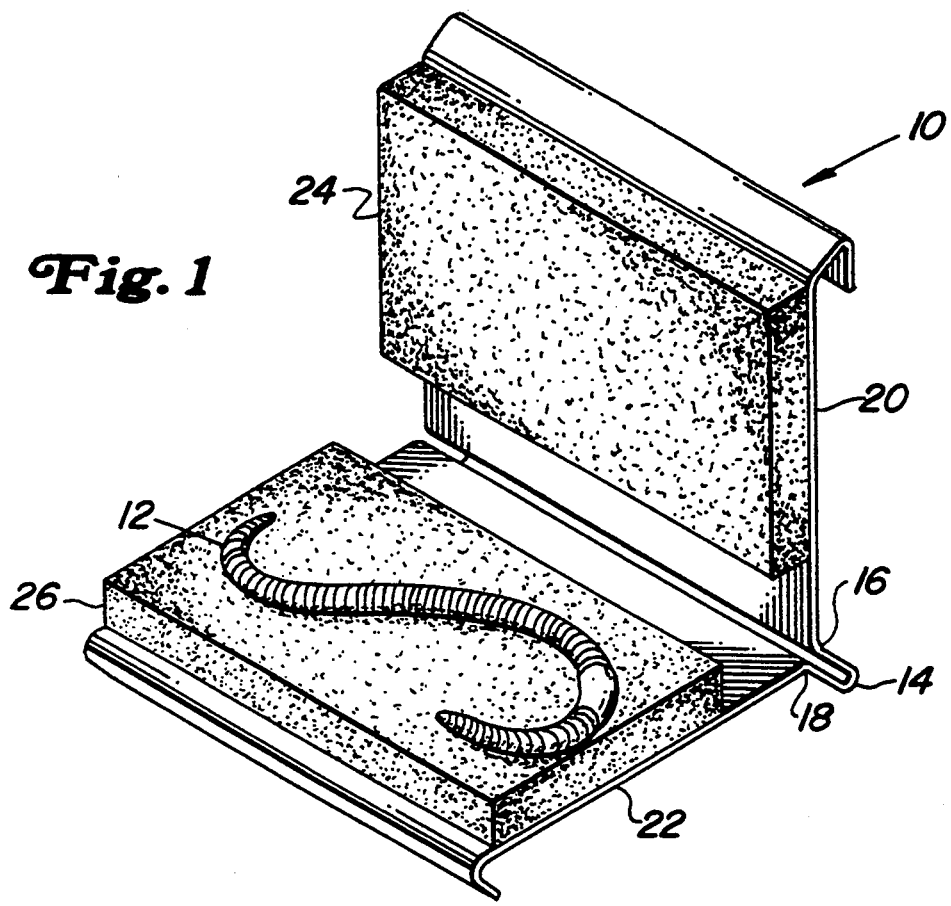
FIG. 1 is an isometric view of the invention in the open configuration.
Figure 2:
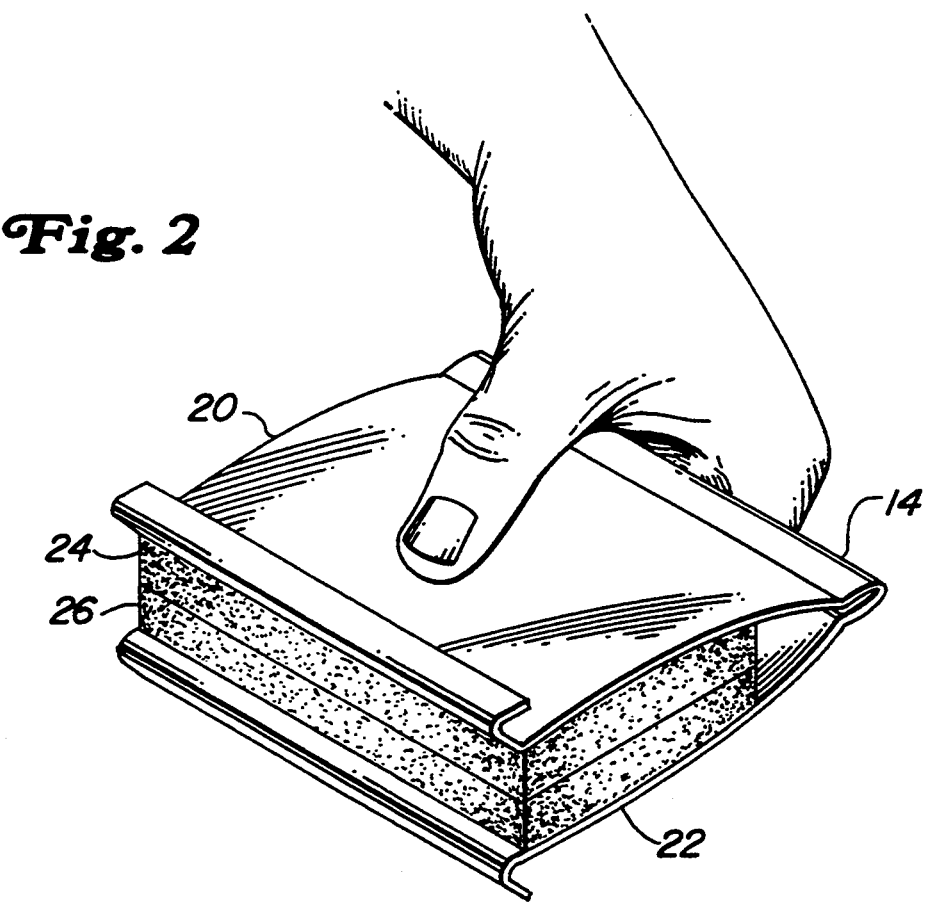
FIG. 2 is an isometric view of the invention held in the closed position.

FIG. 1 of the drawings depicts the invention 10 in the open configuration and into which an artificial fishing lure 12 has been placed in preparation for drying. The invention is produced from a rectangular section of stiff but resilient plastic material, such as molded vinyl, approximately twenty to twenty five centimeters in length, ten to 12 centimeters in width, and one millimeter in thickness. The rectangular section is first folded over upon itself along the centerline to form a foldline 14. The two panels 20, 22 thus formed are then folded back to approximately a 60 to 90 degree angle to form a hingeline 16, 18 in each of the panels and the free ends of the panels are then bent backwardly to form outwardly projecting lip elements (27) to facilitate the grasping and closing of the invention. FIG. 1 depicts the natural, open condition of the invention while FIG. 2 depicts the invention held in the closed position. Thus, the stiffness of the material permits the foldline 14 and the two hingelines 16, 18 to be formed while the resiliency of the material allows the two panels to be forced together for lure drying and then to spring apart to the open position.

Also depicted most clearly in FIG. 1 are two enlarged rectangular pads of water absorbent material such as ordinary cellulose sponge 24, 26 which are affixed to the two panels 20, 22. The absorbent pads 24, 26 may be affixed by waterproof adhesive which will not damage the plastic or absorbent material, such as PL 300 foam board adhesive. This combination of components will permit the invention to float in the event that it is inadvertently dropped into the water.

FIG. 2 shows the invention being held in the closed position. In this position the enclosed lure is squeezed between the two liquid absorbing pads and is dried. When the pressure is relieved on the two panels 20, 22, the device springs open to permit removal of the lure and also allows the absorbent pads to be forcibly pressed together again to expel excess moisture out the sides of the pads (24) (26) before releasing the pressure on the pads again, thereby allowing the pads to dry for subsequent use.

While the invention has been described in what is considered to be a preferred embodiment, it will be obvious to one skilled in the art that many modifications and variations are possible in light of the above teachings. It us therefore to be understood that, within the scope of the appended claims, the invention may be practiced otherwise than as specifically described.

I claim:

1. An apparatus for drying artificial lures prior to the application of fishing lure scent wherein the apparatus comprises
    a substantially Y-shaped shell having an integrally formed first and second generally flat rectangular panels, wherein each of said panels have an interior face and an exterior face;
    a first enlarged generally flat rectangular water absorbent pad affixed to the interior face of said first panel, and a second enlarged generally flat rectangular water absorbent pad affixed to the interior face of said second panel; wherein, each of said pads occupies a substantial portion of the interior faces of the respective panels;
    hinge means formed integrally with said first and second panels permitting relative movement between said panels from an open position to a closed portion; whereby, in the closed position the panels can be forcibly moved towards one another to expel liquid from the periphery of the compressed absorbent pads disposed intermediate said panels.

2. The apparatus as in claim 1 further comprising:
    outwardly projecting grasping means formed on the free ends of said panels for facilitating the relative closing movement between said panels.

3. The apparatus as in claim 2 wherein, said grasping means comprise outwardly projecting lip elements formed integrally with the free ends of said panels.

* * * * *